Dec. 19, 1933.                    I. GOTH                    1,940,542

SHOE WITH ELASTIC RUBBER INLETS

Filed May 11, 1931

Inventor:
Imre Goth
By *[signature]*
Attorney.

Patented Dec. 19, 1933

1,940,542

UNITED STATES PATENT OFFICE 1,940,542

SHOE WITH ELASTIC RUBBER INLETS

Imre Goth, Berlin, Germany

Application May 11, 1931, Serial No. 536,572, and in Germany May 23, 1930

2 Claims. (Cl. 36—51)

This invention relates to a shoe (half-shoe or boot).

It has already been proposed to furnish shoes with elastic rubber inlets, for example, at the front or at the sides. Hitherto it has been the practice only to use elastic as material for this purpose. This elastic is woven from elastic threads. The rubber inlets are stitched to the leather.

These known inlets made of elastic have the disadvantage of less durability. Moreover, in consequence of the thick edges, uncomfortable pressure is caused where they are stitched to the leather.

The present invention is intended to solve the problem of avoiding the disadvantages shown by the known inlets. According to one feature of the invention the rubber inlets in question consist of solid rubber and are attached between the upper leather and lining, the solid rubber inlets being stuck, vulcanized or the like between the parts mentioned. In addition these solid rubber inlets are suitably made thinner at the edges.

By the present invention it is attained that places of pressure no longer exist. Moreover, the rubber inlets according to the invention have a greater strength and elasticity than the known inlets and consequently have the advantage of greater durability. Further, the solid rubber inlets according to the invention are absolutely waterproof without any supplementary means, as the solid rubber inlet and the leather are seamlessly joined together.

In order to eliminate the great adhesion of the solid rubber inlet and thereby the inconvenient sticking of the stocking to the same, leather strips are, according to a further feature of the invention, provided at the inner side of the solid rubber inlet. According to another characterization of the invention, one may use instead of these lateral strips a leather tongue, which is not firmly joined to the solid rubber inlets and at least not joined to the leather on the longitudinal side.

A further feature of the invention is that the solid rubber inlet is furnished with ventilation openings, should the ventilation of the feet through the pores of the leather not be sufficient.

Figure 1:
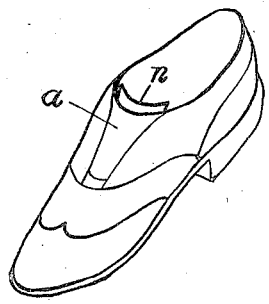
Figure 2:
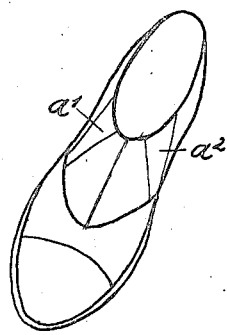
Figure 3:
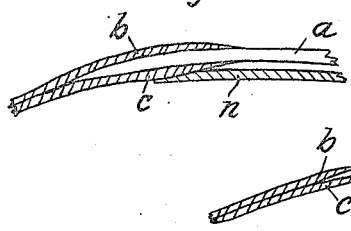
Figure 4:
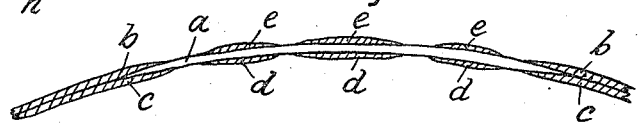
Figure 5:
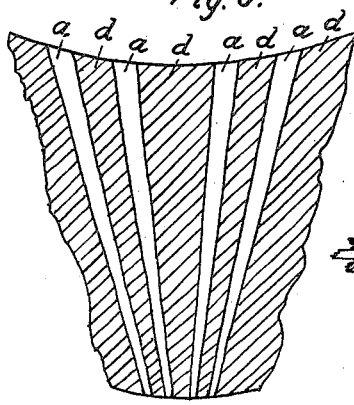
Figure 6:
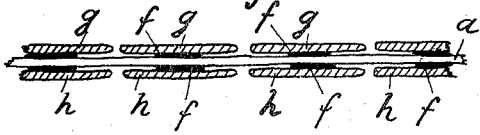

The invention is set forth in the embodiment according to the accompanying drawing, in which:

Figure 1 is a diagrammatic perspective view of a shoe showing the central rubber insert or inlet, Fig. 2 is a similar view showing a modified construction of two rubber inserts, Fig. 3 is a part sectional view showing the tongue and the insert attached to the leather of the shoe, Fig. 4 is a part sectional view showing a modified construction of the insert attached to the leather of a shoe, Fig. 5 is a front view of a portion of the insert of Fig. 4, and Fig. 6 is a part sectional view of a modified insert.

The strong 1 to 2 mm thick solid rubber inlet $a$ (Fig. 1) is attached to the upper or outer part of the shoe where the laces are usually positioned, or one each $a1$, $a2$, (Fig. 2) at both sides. It is most advisable that the solid rubber inlet should be in the shape of a wedge, the narrow end of which is downwardly directed (Fig. 1) and is produced from firstclass caoutchouc material which is also used in the manufacture of pneumatic tubes. Fig. 3 shows the joining of the leather and rubber inlet. The solid rubber inlet $a$ is either stuck or vulcanized between the leather $b$ and lining $c$ whereby the stuck or vulcanized edges of the rubber inlet and of the leather are made thin in order to avoid thick places.

In order to enable the stocking to easily slip past the rubber inlet, either an ordinary tongue is attached behind the rubber inlet or plain leather strips $d$ (Figs. 4 and 5) are singly stuck or vulcanized on the inner side of the rubber inlet from the bottom to the top, i. e., perpendicular to the expanding direction. In order to still further secure an easy slipping and to give a certain stiffness to the upper edge of the rubber inlet (in the case of half-shoes) against turning inwardly—when putting on the shoes—these leather strips are turned over on the upper edge of the rubber inlet and are continued on the outside as strips $e$ in any desired length (Fig. 4). In addition to the practical use, the strips may be developed as ornamentation on the outside.

The individual strips always show a distance between each other, resulting in expandable rubber areas (Figs. 4 and 5) or, if the leather strips should cover the entire rubber inlet, the strips will not be stuck or vulcanized at the edges of the longitudinal direction, so that the rubber areas are formed between the individual sticking or vulcanizing places. Fig. 6 shows in the cross section an arrangement of the leather strips, according to which the rubber inlet $a$, the individual leather strips $g$, $h$ and the sticking or vulcanizing places $f$ are set forth.

A tongue $n$ may be provided in the shoe in the usual manner and, as shown in Figs. 1 and 3, this tongue forms a non-adhering surface for the stocking, particularly when the shoe is being removed or pushed onto the foot.

Several parallel strong rubber strips may also be used instead of a rubber inlet, the expansion of which takes place in their longitudinal direction.

The rubber inlet may be of various colors, it may have a smooth or profiled (patterned) surface and, as already mentioned above, can be provided with holes for the purpose of better ventilation.

The rubber inlet according to the invention can be used for shoes made of canvas (tennis shoes, gymnasium shoes), silk (dancing shoes) or the like.

What I claim as new and desire to secure by Letters Patent of the United States is as follows:

1. A shoe comprising an upper leather portion, a lining, and at least one elastic rubber insert, the said rubber insert consisting of solid rubber, being attached between the upper leather and lining and being furnished with edges made suitably thin towards the outside except the free upper edge and being provided with a leather tongue not firmly connected with the solid rubber insert and not connected with the leather at least on one longitudinal side, thus preventing the sticking of the stocking to the rubber insert.

2. A shoe comprising an upper leather portion and lining having a front opening, an elastic rubber insert between the edges of said opening, said rubber insert consisting of solid rubber and being securely attached between the upper leather and lining and provided with securing edges which are thin towards the outside, and means beneath the rubber insert forming a non-adhering surface for the stocking.

IMRE GOTH.